United States Patent
Wilke

(10) Patent No.: US 8,036,837 B2
(45) Date of Patent: Oct. 11, 2011

(54) DIAGNOSTIC METHOD FOR DETECTING CONTROL VALVE COMPONENT FAILURE

(75) Inventor: Galen Dale Wilke, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 441 days.

(21) Appl. No.: 12/040,498

(22) Filed: Feb. 29, 2008

(65) Prior Publication Data

US 2009/0222220 A1 Sep. 3, 2009

(51) Int. Cl.
*G01B 5/28* (2006.01)
*F01B 31/00* (2006.01)
*G01F 1/38* (2006.01)

(52) U.S. Cl. ............ 702/35; 92/130 D; 73/861.47

(58) Field of Classification Search ............ 702/34, 702/33, 35–36, 51, 81, 84, 127, 138–140, 702/149–150, 182–185, 189, 193; 73/1.57, 73/1.66, 1.68, 1.71–1.72, 700, 715–716, 73/861.42, 861.47; 92/6 D, 13.2–13.3, 49, 92/130 D, 132

See application file for complete search history.

(56) References Cited

U.S. PATENT DOCUMENTS

| | | | |
|---|---|---|---|
| 5,573,032 | A | 11/1996 | Lenz et al. |
| 6,449,715 | B1 | 9/2002 | Krivoshein |
| 7,219,691 | B2 | 5/2007 | Gethmann et al. |
| 7,516,043 | B2 | 4/2009 | Junk et al. |
| 2001/0037159 | A1 | 11/2001 | Boger et al. |

FOREIGN PATENT DOCUMENTS

| | | |
|---|---|---|
| DE | 296 12 346 U1 | 9/1997 |
| DE | 197 12 852 A1 | 10/1998 |
| DE | 199 47 129 A1 | 4/2001 |

OTHER PUBLICATIONS

Sharif et al., Fault Diagnosis in Industrial Control Valves and Actuators, May 18-21, 1998, IEEE Instrumentation and Measurement Technology Conference, St. Paul, Minnesota, pp. 770-778.*
Ould Bouamama et al., Fault Detection and Isolation of Smart Actuators Using Bond Graphs and External Models, 2005, Control Engineering Practice 13, pp. 159-175.*
Communication Relating to the Results of the Partial International Search for PCT/US2009/031273, mailed May 11, 2009.
International Search Report for PCT/US2009/031273, mailed Jun. 25, 2009.
Gentech Sensing Solutions Product characteristics for model FCS-04 Flow sensor, printed on Nov. 4, 2009 from <http://www.gentechsensors.com/content/product/fcs-04 on Nov. 4, 2009>. 3 pages.

(Continued)

*Primary Examiner* — Michael Nghiem
*Assistant Examiner* — Toan Le
(74) *Attorney, Agent, or Firm* — Marshall, Gerstein & Borun LLP

(57) ABSTRACT

The claimed method and system identifies faults and/or deterioration of components in a process control valve. The system may use different sensor combinations to provide the necessary data to compute irregular component integrity. Alerts may be generated to indicate potential component integrity problems. In particular, the system may detect potential deterioration and/or faults in actuator springs, pneumatic tubing and piping, and bellows seals. The claimed system may be communicatively coupled to a process control network to provide a more elaborate alarm system. Moreover, additional statistical methods may be used to refine the detection accuracy of the system.

12 Claims, 15 Drawing Sheets

OTHER PUBLICATIONS

"Non-Adjustable Flow Switches" M-64 Series, Malema flow sensors, 3 pages, Copyright 1998.
"Non-Adjustable Flow Switches" M-60 Series, Malema flow sensors, 4 pages, Copyright 1998.

Product Bulletin 62.1:DVC6000, Emerson Process Management, dated Feb. 2008.
Written Opinion for International Application No. PCT/US2009/031273, dated Apr. 29, 2009.

* cited by examiner

DIAGNOSTIC METHOD FOR DETECTING CONTROL VALVE COMPONENT FAILURE

FIELD OF INVENTION

This patent relates generally to performing diagnostics and maintenance in a process plant and, more particularly, to providing diagnostic capabilities within a process plant in a manner that reduces or prevents control valve failures within the process plant.

BACKGROUND

Failure of a control valve in an industrial process almost always impacts plant operation. Generally, control valve failures may impact the response of the control valve to control signals. In particular, a control valve may become less-responsive or sluggish to a control signal, which may lead to degradation in control performance that induces process variability, which is costly to the plant operators or worse, may lead to hazardous conditions. Thus, early detection of control valve degradation or deterioration may allow for orderly scheduled maintenance of a control valve in a manner that would prevent disruption of operation to a process plant.

Control valve performance degradation may occur for a number of reasons. Generally, deterioration of component parts may be a primary factor. Deterioration of parts, however, is typically detected only upon degradation of control valve operation to the point where the control valve malfunctions, due to, for example, a component failure, at which point it may be too late to perform preventative maintenance. One approach to preventative maintenance may be to physically inspect the components of a control valve on a periodic basis. This option, however, is costly as it requires that the process control loop using the control valve be shut down and/or that the control valve be removed and disassembled for review.

SUMMARY

In accordance with one or more of the disclosed examples, a claimed method and system identifies faults and/or deterioration of components in a process control valve. In some embodiments, the claimed method and system detects deterioration and/or faults of actuator springs, pneumatic tubing and piping, and bellows seals.

In one embodiment, actuator spring deterioration or fault in a pneumatic control valve may be detected by monitoring an actuator pressure and actuator rod movement.

In one embodiment, a bellows deterioration or fault in a control valve may be detected by monitoring a bellows chamber pressure and valve movement.

In one embodiment, a source of an actuator leak may be identified. In one embodiment, a leak in one of instrument tubing or a diaphragm may be detected.

DETAILED DESCRIPTION

Figure 1:
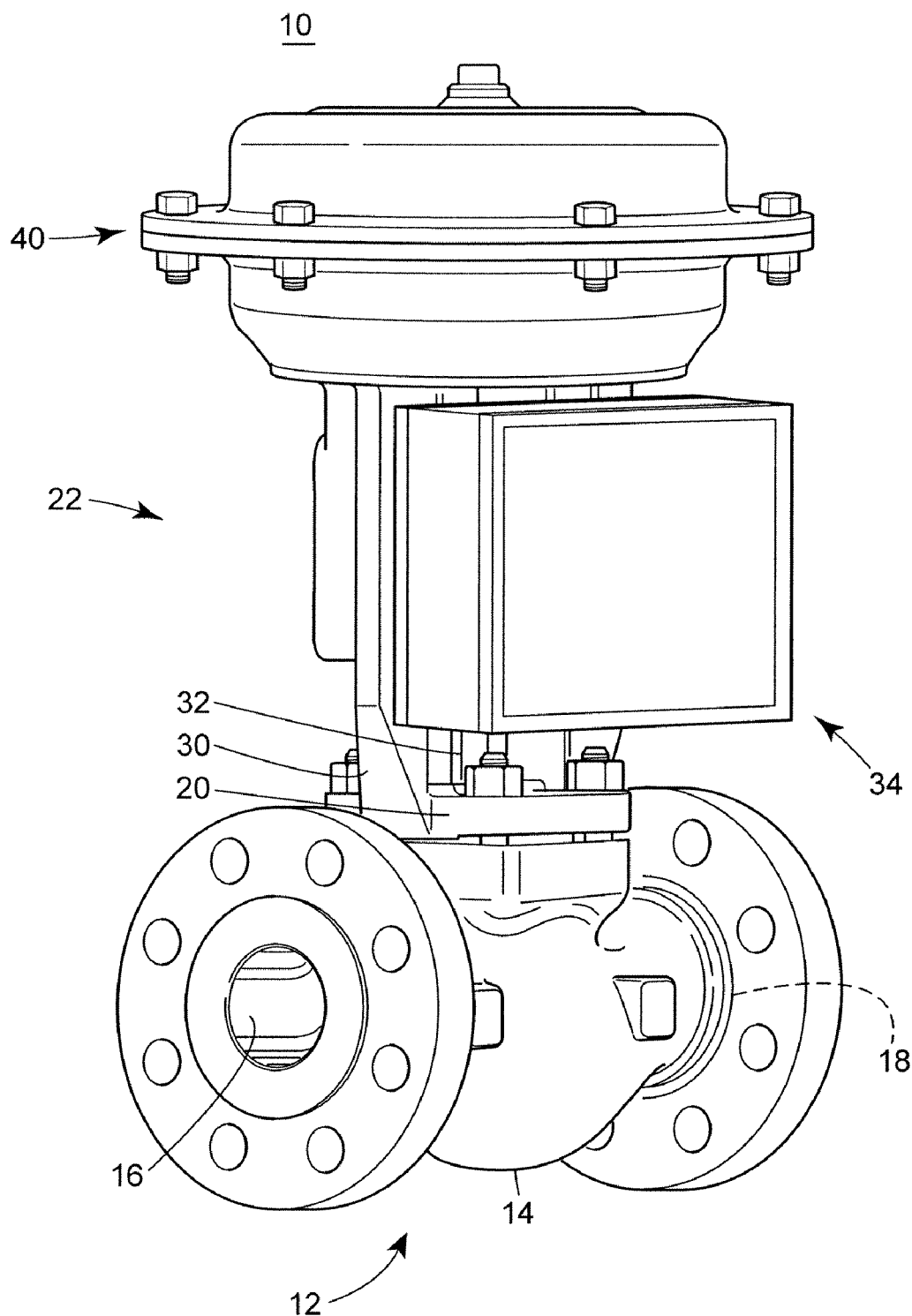
FIG. 1 illustrates a control valve.

FIG. 1 illustrates a control valve assembly 10 that may be used in a process control system, e.g., a processing plant. The control valve assembly 10 includes a valve 12, an actuator 22, and a control valve instrument or positioner 34. The valve 12 includes a valve body 14, an inlet port 16, an outlet port 18, and the actuator 22 includes a valve bonnet 20 and pneumatic diaphragm casing 40. Disposed through the valve bonnet 20 may be a valve stem 32 that may be used to operate the valve 12. A yoke 30 may be attached to or provided with the bonnet 20. While the yoke 30 may be connected to the valve bonnet 20, as illustrated in FIG. 1, the yoke 30 may be mounted to another part of the valve body 14 in other embodiments. The yoke 30 may be used to couple the pneumatic diaphragm casing 40 to the valve body 14. The valve stem 32, which may form a portion of a valve stem assembly 15, described further below, may be adapted to transmit force from the pneumatic diaphragm casing 40 to the valve 12, thereby controlling operation of the valve 12.

The pneumatic positioner 34 may be attached to the yoke 30. The positioner 34 may be used to control the actuator 22. Generally, positioners such as positioner 34 may be electro-pneumatic and may be used in process control loops to operate control valve assembly 10 in a proscribed manner. That is, the positioner 34 may operate by receiving an electronic input signal at an I/P (current to pressure) stage (components not shown) to convert the electronic input signal to a pneumatic output signal, which may drive the actuator 22. The output pressure signal may be applied directly to the pneumatic diaphragm casing, which in turn couples the pneumatic signal to the valve to control flow in a manner proportional to the electronic input signal.

Figure 2:
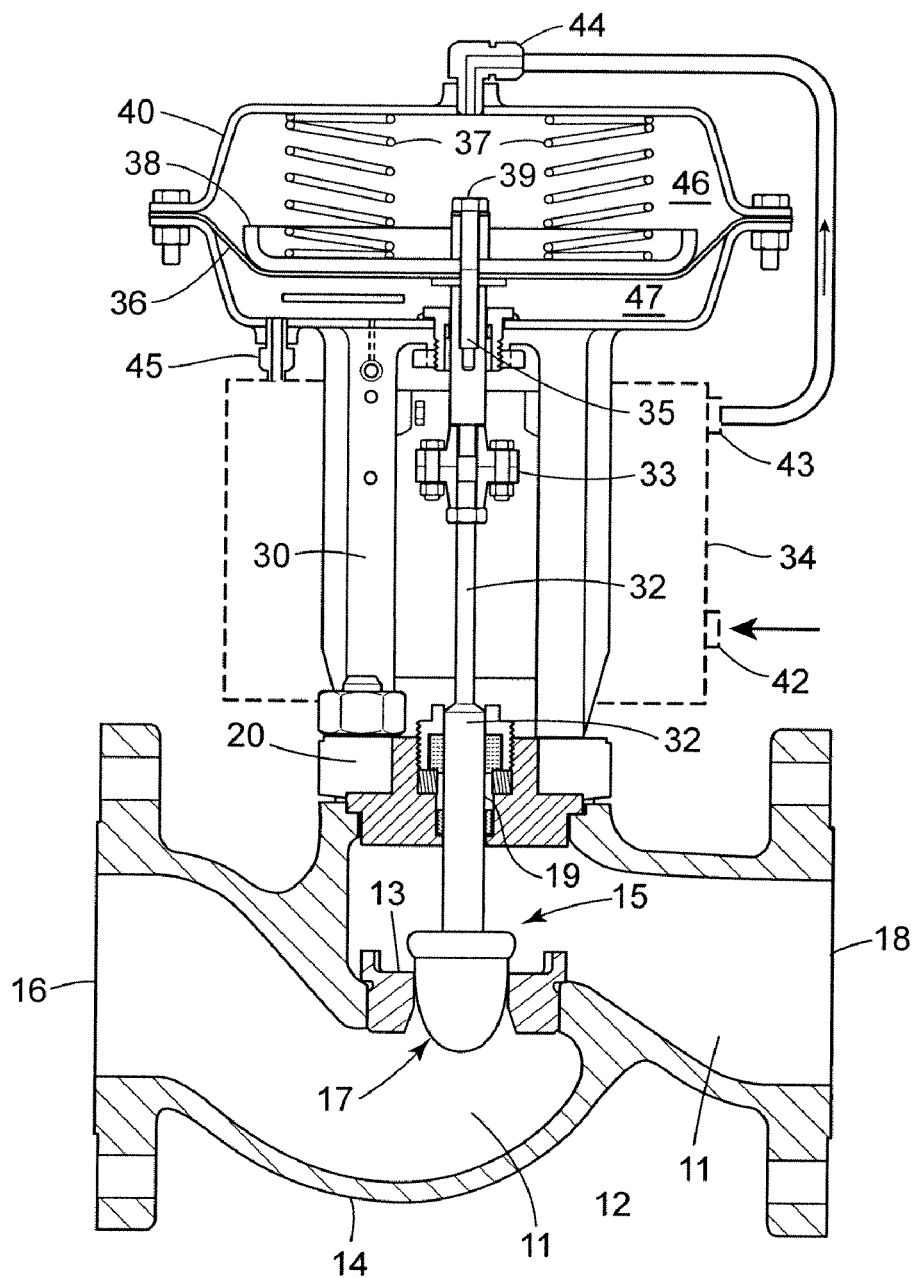
FIG. 2 illustrates a cross-sectional view of the control valve.

FIG. 2 illustrates a cross-sectional view of the control valve assembly 10 of FIG. 1. Note that analogous members are labeled similarly. FIG. 2 illustrates the valve body 14 defining the inlet port 16, the outlet port 18, and a passageway 11 communicating between the inlet port 16 and outlet port 18. A valve seat 13 may be disposed within the valve body 14 through which the passageway 11 passes. A valve stem assembly 15 may consist of a valve plug 17 disposed in the passageway and movable relative to the valve seat 13, thereby controlling fluid flow through the valve body 14. The valve stem assembly 15 further includes a valve stem 32 coupled to the valve plug 17 and extending through a bore 19 (e.g., a valve body opening) in the valve bonnet 20. When the valve stem assembly 15 is lifted to open a port between the valve plug 17 and the valve seat 13, flow of fluid through the passageway 11 increases. Lowering the valve stem assembly 15 will close the port and decrease fluid flow until the valve plug 17 completely engages the valve seat 13 (as illustrated in FIG. 2), thereby preventing any further fluid flow through the passageway 11.

The valve stem assembly 15 may be coupled to an actuator 22 for raising and lowering the valve stem assembly 15. The actuator 22 may include a diaphragm casing 40 that houses diaphragm 36 which is coupled to an actuator rod 35. The diaphragm 36 may be biased by a set of (i.e., one or more) actuator springs 37. While the embodiment of FIG. 2 illustrates that the diaphragm 36 may be coupled to the actuator rod 35 via a disk 38 and a bolt 39, other fastening means known in the art may be used as well. As illustrated in FIG. 2, the valve stem 32 may be coupled to an actuator rod 35 by a valve stem connector 33. The actuator 22 may be operated to raise or lower the actuator rod 35 and consequently raise or lower the valve stem assembly 15. The diaphragm casing 40 of actuator 22 may be supported and positioned over the valve body 12 by the yoke 30.

The actuator 22 may be a pneumatic actuator that is controlled by the positioner 34. The positioner 34 may have a fluid pressure source inlet port 42 that accepts pressurized gas from a fluid source (not shown). The positioner 34 may have an outlet port 43 that is fluidly coupled to an inlet port 44 of the actuator diaphragm casing 22. The actuator diaphragm casing may have an outlet vent 45 for venting the non-pressurized side of the diaphragm casing 40. While the embodiment of FIG. 2 illustrates that the vent outlet port 45 may be coupled to the positioner 34, it may be common that vent 45 is open to ambient atmosphere. The positioner 34 may generally operate to control the amount and timing of applied gas to the diaphragm casing 40 from a pressurized source, such as a compressed air source (not shown). As gas is applied to the inlet port 44 of the actuator, the pressure in the actuator chamber, e.g., chamber 46, may exert a force on the actuator rod 35 that is proportional to the applied pressure and the effective area of the actuator diaphragm 36. Thus, as the diaphragm 36 is displaced, the volume of a lower chamber 47 may source or sink fluid through outlet port 45.

Figure 3A:
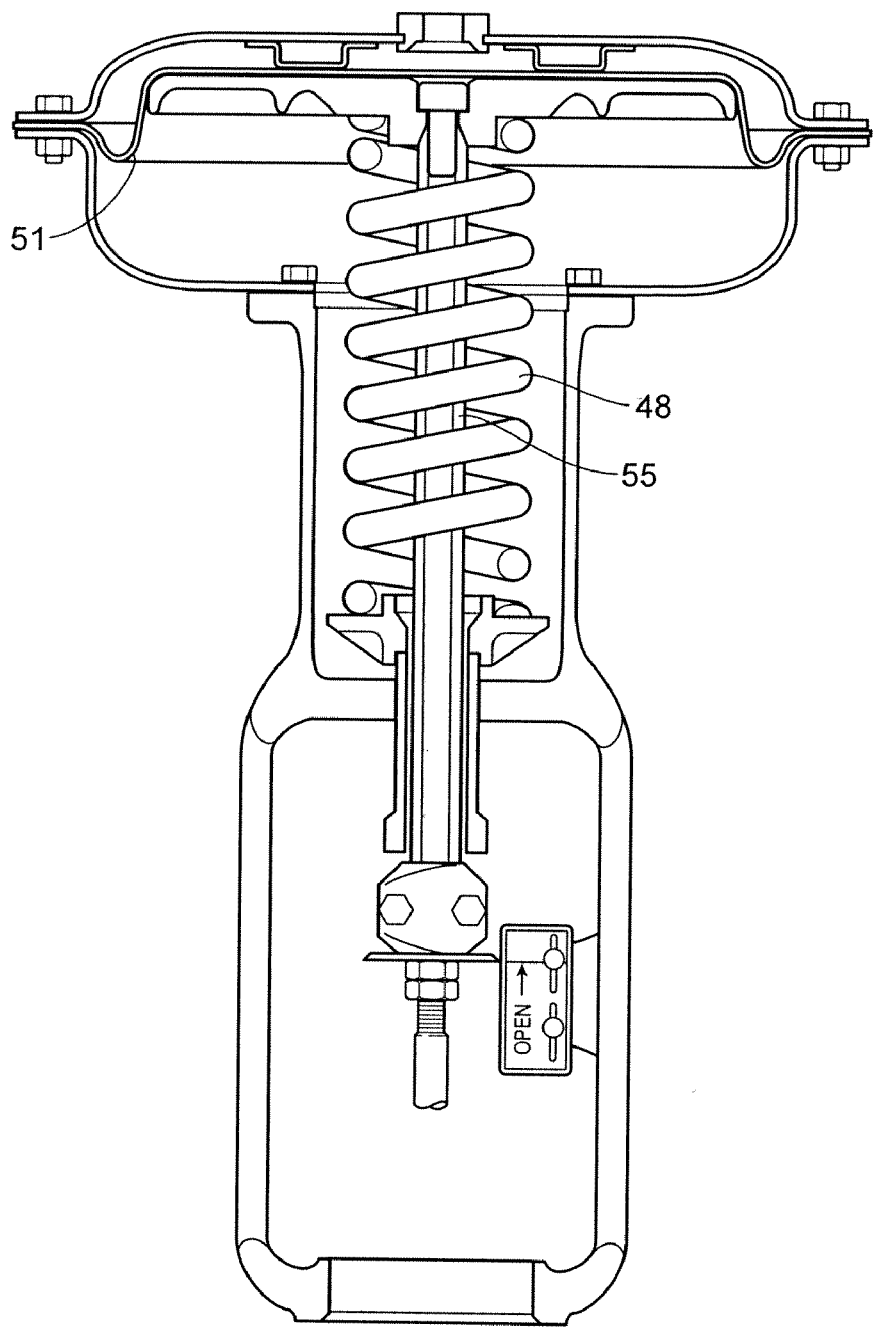
FIG. 3A illustrates a direct-acting valve configuration.
Figure 3B:
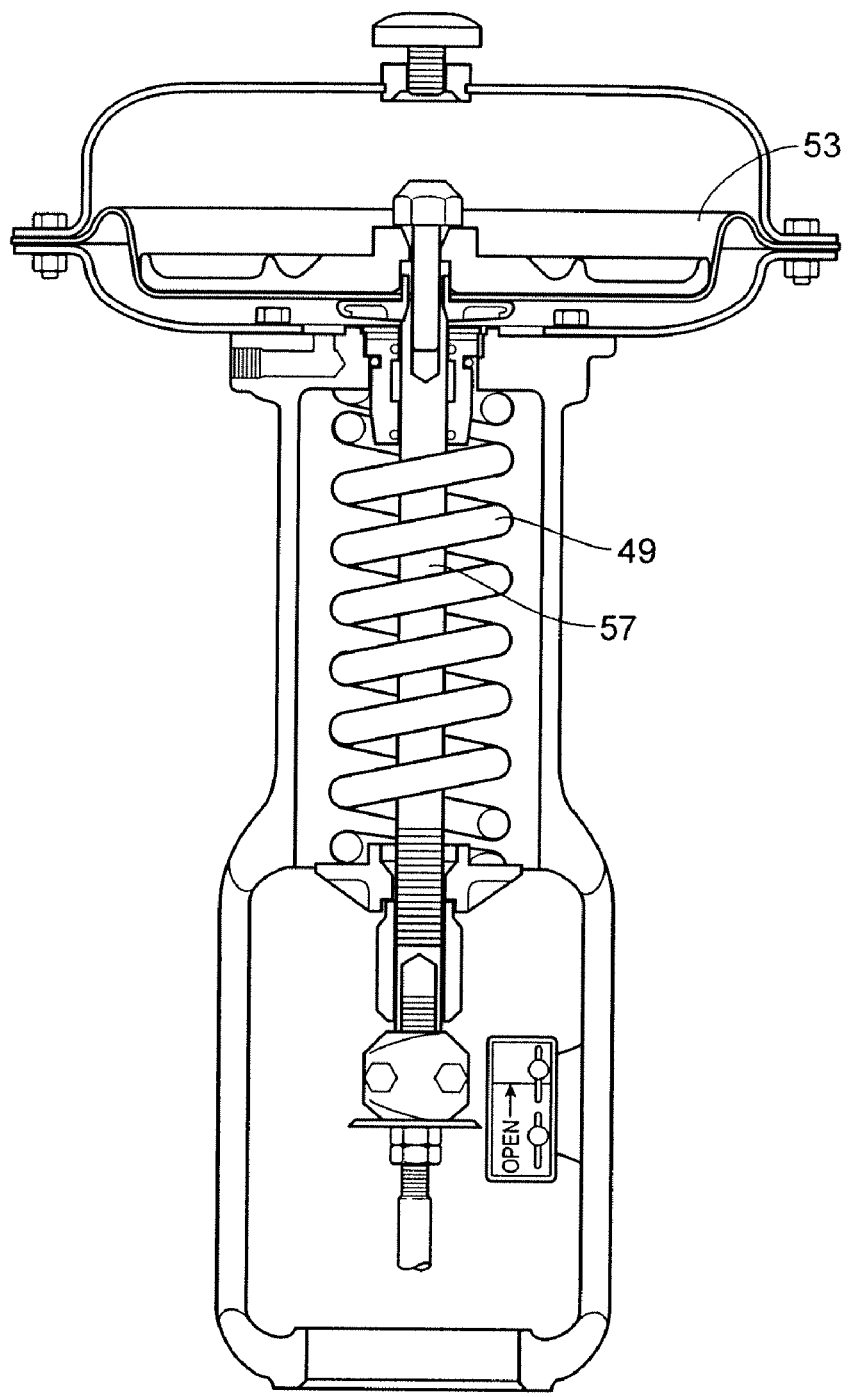
FIG. 3B illustrates a reverse-acting valve configuration.

While FIG. 2 illustrates a pneumatic actuator embodiment employing a plurality of springs 37, it should be noted that some pneumatic actuators may use only a single spring. Such embodiments may be illustrated in FIGS. 3A and 3B. In FIGS. 3A and 3B, a single spring 48 and 49 is used to bias a diaphragm 51 and 53, respectively. FIG. 3A illustrates a direct-acting configuration in which the spring 48 biases the actuator rod 55 for a push-down-to-close construction valve, whereas FIG. 3B illustrates a reverse-acting configuration in which the spring 49 biases the actuator rod 57 for a push-down-to-open construction valve.

Detecting Abnormal Control Valve Operation

The described system herein assists in determining the cause of valve performance degradation by identifying control valve components in a deteriorating state. In particular, various sensor readings may be used with algorithms described herein to determine and identify control valve components that may be in poor condition or that may be operating outside an expected performance range. That is, the system may enable early detection of component deterioration before critical malfunction of the control valve.

In one embodiment, the system may monitor control valve function deterioration due to components such as actuator springs, pneumatic tubing and piping, and/or bellow seals. In a control valve, actuator response may be negatively affected by deterioration in actuator springs used to bias the actuator. As the springs deteriorate, response times for switching the valve to its operational state (open or closed) may be delayed. Actuator response may be further affected by leaks in pneumatic pathways (e.g., tubes and pipes to and from pneumatic outlets and inlets) or partial or total failure of an actuator diaphragm. Additionally, control valve response may suffer from deterioration in bellows seals that are used to isolate the control valve process environment from an external atmosphere (e.g., an environment surrounding a control valve). The system described herein may be used to detect or predict deterioration in one or more of the described components.

Detecting Actuator Spring Fault or Deterioration

Spring failure is one failure mode that may cause a reduction in response time (i.e., sluggishness) of a control valve. Deterioration of the single spring in actuators such as those illustrated in FIGS. 3A and 3B may cause instant failure. In a multi-spring actuator, failure of a single spring may not cause an immediate control valve failure or loss of control. However, failure of even a single spring in a multi-spring actuator may result in uneven loading of an actuator that may reduce actuator thrust which could limit operating range of the valve or decrease seat load, thereby increasing seat leakage within the valve. Also, failure of a single spring may indicate that other springs may fail soon.

Generally, spring deterioration may occur due to a number of factors such as erosion or oxidation of the spring, or structural/mechanical breakdown such as fatigue. Either of these conditions may cause the spring to exhibit diminishing elasticity among other physical parameters of the spring.

An actuator spring deterioration detection system as described herein may be implemented to predict or detect spring deterioration or failure so that preventative measures may be taken to reduce maintenance costs and costly plant shutdowns. The spring deterioration detection system may be implemented in an existing process control system or installed as an independently functioning computing unit. Generally, the spring deterioration detection system may be implemented as hardware or software running on a computing device.

In one embodiment, calculating and monitoring a current value of an actuator spring constant may be used to detect spring deterioration. In this embodiment, a spring constant may be calculated and compared to an initial or designated spring constant value. If the calculated spring constant deviates from the initial or designated value by more than a predetermined threshold, spring deterioration or failure may be detected. In another embodiment, actuator pressure and valve travel may be monitored and measured to calculate the spring constant value. The following formula may be used to calculate the spring constant value:

$$\Delta PA = \Delta T K_a$$

where $\Delta T$ is valve travel distance, $\Delta P$ is a change in applied pressure to an actuator, A is an effective diaphragm area for a diaphragm of the actuator, and $K_a$ is the spring constant.

Figure 4A:
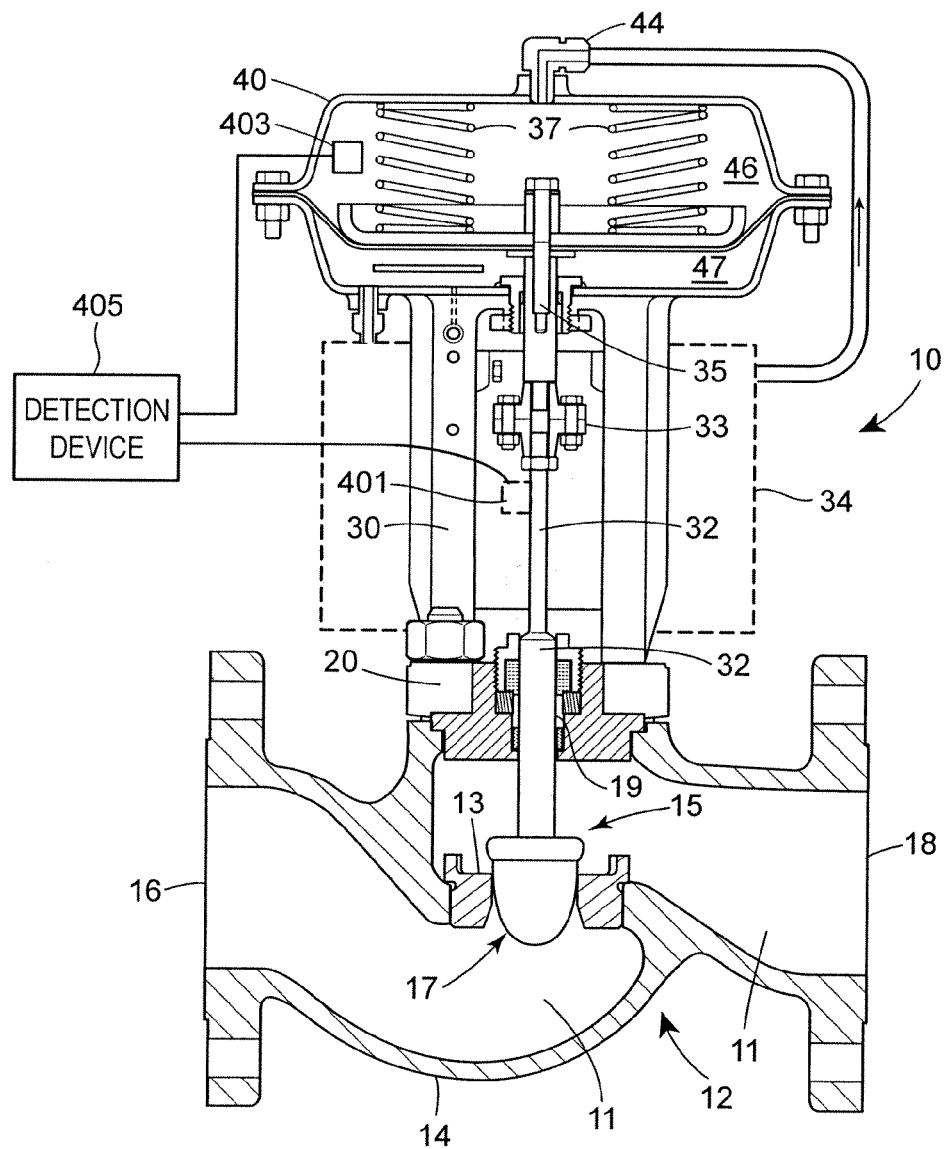
FIG. 4A illustrates an embodiment of a control valve configured to determine spring deterioration.

FIG. 4A illustrates an embodiment of a control valve that may be used to determine spring deterioration in an actuator. Common elements of FIG. 2 and FIG. 4A are labeled similarly. FIG. 4A illustrates that a position sensor 401 may provide data on the position, movement, and/or travel of a control valve assembly 10. The travel of the valve 12 may be based on the movement of the actuator rod 35. As illustrated in FIG. 2, the actuator rod 35 may be operatively coupled to the valve stem 32, valve stem connector 33, and valve plug 17. Thus, measuring travel of any one of this set of components may be indicative of travel of any member of the set of components.

A pressure sensor 403 may provide data indicative of a pressure applied to the upper pressure chamber 46.

Additionally, a device 405 may be used to receive sensor data from one or both of the travel sensor 401 or the pressure sensor 403. The device 405 may then implement an algorithm, as further discussed below, to detect and indicate a spring fault. While the device 405 in FIG. 4A is shown separately from the positioner 34, device 405 may be implemented as part of the positioner 34. This may be the case, for example, when the positioner 34 is a digital positioner having a processor and memory.

Figure 4B:
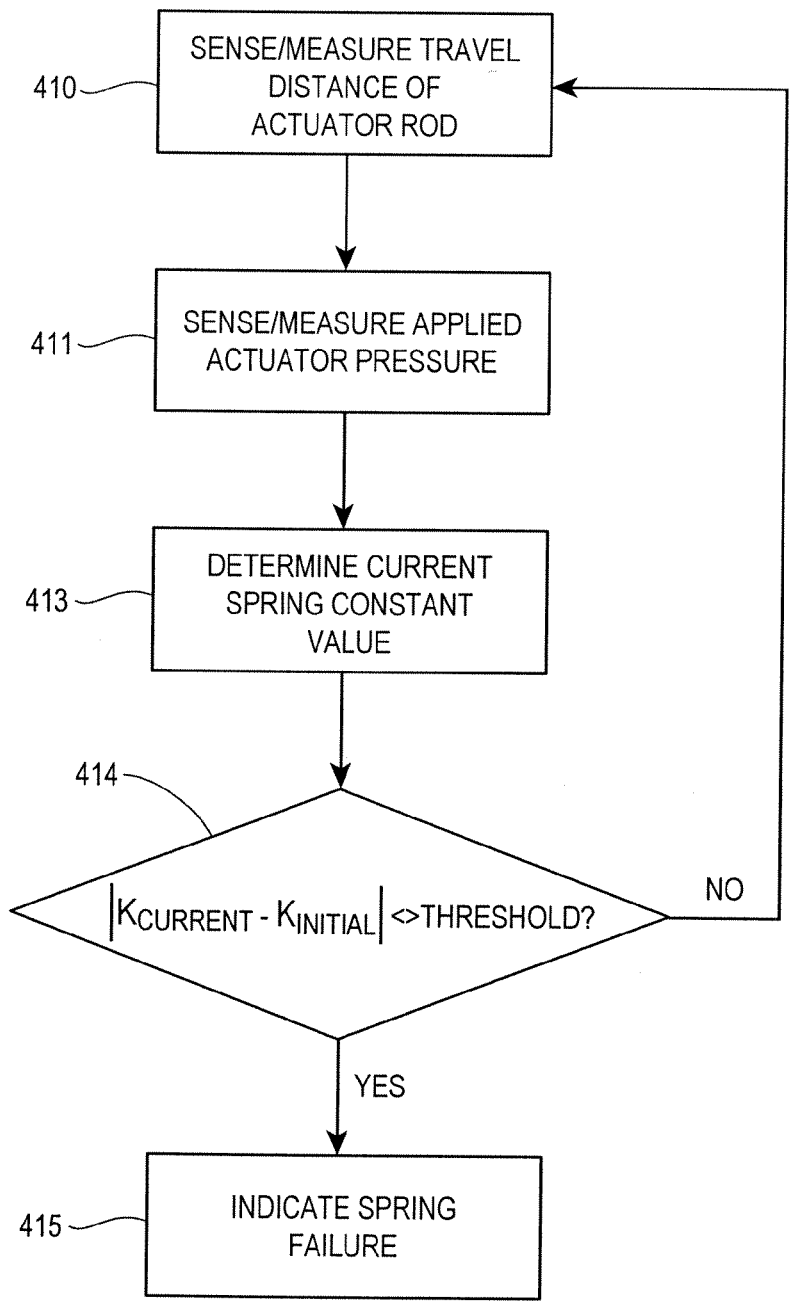
FIG. 4B illustrates a process embodiment for detecting spring deterioration.

FIG. 4B illustrates a process embodiment for detecting actuator spring deterioration. In block 410, a travel of the valve (e.g., travel of the actuator rod 35, connector 33, or valve stem 32) may be sensed. In one embodiment, the position of the valve may be sampled on a periodic basis and travel may be determined based on the difference between two sampled positions. In block 411, an applied pressure may be sensed. In one embodiment, a change in applied pressure may be sensed by periodically sampling the applied pressure and taking the difference between two sampled readings. In one embodiment, the period for sampling the positions and applied pressure may be synchronized. In other words, both a position and applied pressure sample may be taken at the same time over a common period.

In block 413, a current spring constant of the actuator spring may be determined. For example, at a particular period of time, a valve travel distance may be measured with a corresponding pressure change. In an embodiment, a first position of the valve at a first time may be recorded and a second position of the valve at a second time may be recorded, where the difference between the first position and second position may be calculated as the valve travel distance ΔT. During the valve travel, a corresponding change in applied actuator pressure may occur. This actuator pressure change may be measured by recording the actuator pressure at the first time when the valve is in the first position and then recording the actuator pressure at the second time when the valve reaches the second position. The difference in the two pressure readings may then be used as the change in pressure ΔP.

In block 414, a difference between the calculated current spring value constant may be compared to an initial spring value constant. If the current and initial spring value constants differ by more than a predetermined threshold, then a spring failure or spring deterioration indication may be generated 415. If the difference between current and initial spring value constants does not exceed the threshold, then the process may be repeated. The initial spring value constant may be provided (e.g., by a manufacturer) or blocks 410-413 may be used to determine the initial spring constant.

The threshold may be set to a level based on useful life of the actuator spring or plurality of actuator springs. For example, the threshold may be set to a level indicating that the spring has deteriorated to a point where the spring may have just enough useful life to maintain the valve till a replacement spring(s) may be scheduled and/or installed.

In one embodiment, valve travel ΔT may be calculated only for a single continuous movement of the valve in one direction. In other words, in this embodiment, valve travel may only be taken as the travel distance when the valve travels from a first position to a second position continuously without changing direction while traveling between the two positions. In this embodiment, movement between end points (e.g., where valve travel is physically restricted) may not be included in valve travel ΔT.

In one embodiment, the actuator may include a plurality of springs. This is illustrated in FIG. 2. In this case, the spring constant may be an aggregate spring constant to represent the effects of the plurality of springs. In this embodiment, failure of a single spring may be detected by setting the threshold appropriately. In particular, the threshold may be based on the number of springs and the average contribution of each spring to the aggregate spring constant. For example, the threshold may be set to correspond to a difference in the aggregate spring constant if one of the springs in the plurality of springs is removed (e.g., complete failure). In another example, the threshold may be set to reflect the difference in the aggregate spring constant if one or more of the springs deteriorates to a minimum functionality but before complete failure of any one spring. In one embodiment, the threshold may be set based on the number of springs required to overcome friction and hysteresis of the valve during operation. In this embodiment, the threshold may be set so that the system may indicate a spring problem before valve performance is reduced or compromised.

In one embodiment, the threshold may be set based on the following equation:

$$\frac{\sum_{S=1}^{n} K_S}{K_1},$$

wherein n=total number of springs such that for a plurality of springs, there are a plurality of spring constants designated by $K_1 \ldots K_n$. $K_1$ represents the spring constant of a first spring of the plurality of springs.

Detecting Deterioration of Bellows Seals

Figure 5A:
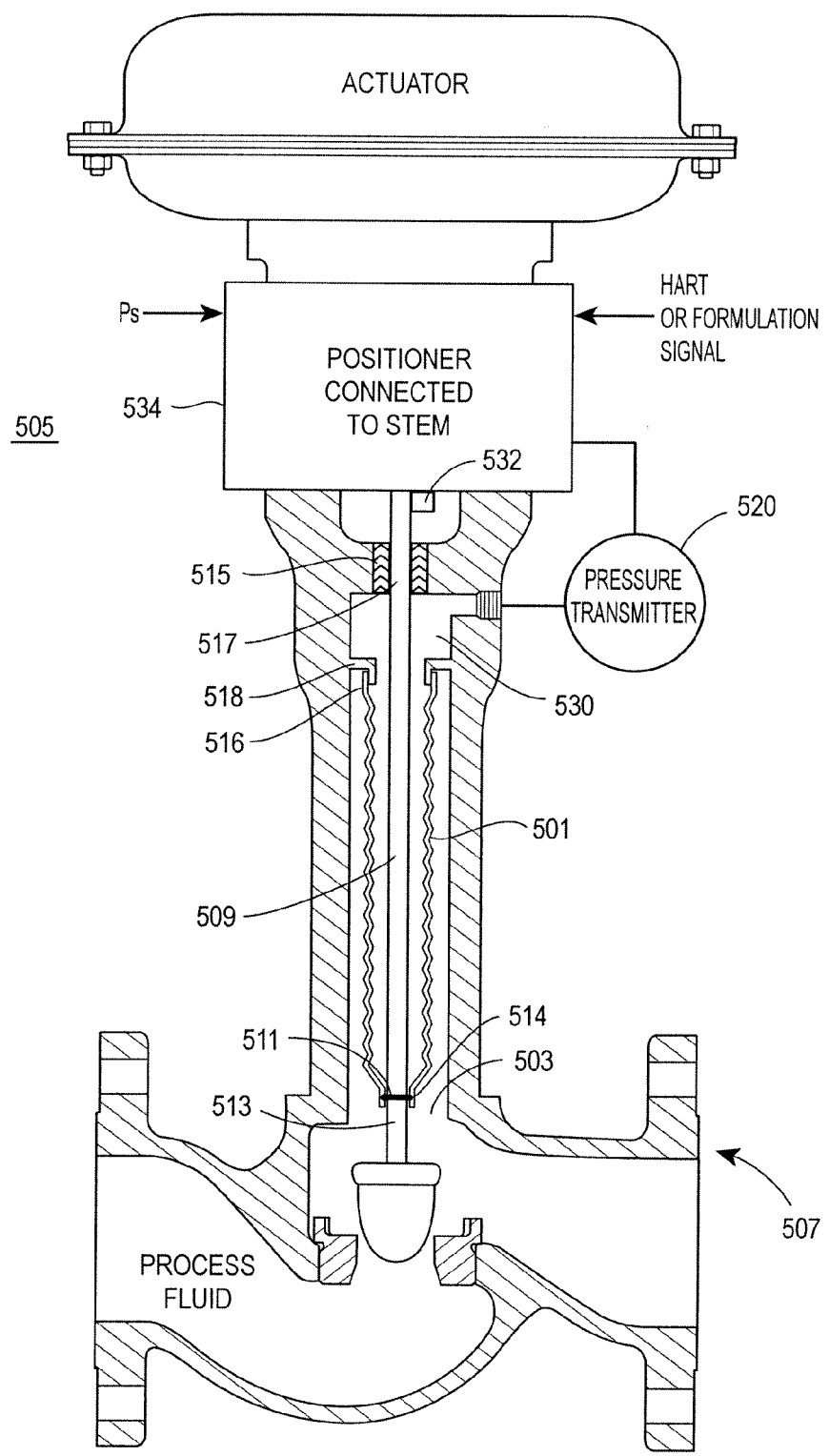
FIG. 5A illustrates a bellows seal installed in a control valve.

FIG. 5A illustrates a control valve using a bellows seal. A bellows 501 may be used as a barrier to isolate ambient plant atmosphere 505 from a process control fluid environment 503. For example, the bellows 501 may be necessary in hazardous or toxic process control applications, where containment of hazardous chemicals from the ambient plant environment is required (e.g., see Occupational Safety and Hazard Administration (OSHA) Regulations).

Generally, a bellows is a flexible one-piece, collapsible, seamless device that has deep folds formed from very thin-walled tubing and may be metallic. The flexibility of the folds of the bellows may be similar in character to that of a helical coiled compression spring. In control valve applications, the bellows 501 may be secured to a first portion 513 of valve stem 509 using a bellows gasket 511 at a first end 514 of the bellows. A second end 516 of the bellows 501 may be secured to a portion 518 of the valve body 14. The valve body portion 518 may be part of the valve bonnet 20. The bellows 501 may isolate the control fluid inside the control valve (e.g., in 503) from surrounding atmosphere 505 external to the control valve, while also allowing the valve stem 509 to move freely without much friction. The diameter and number of folds of a bellows is generally sized to fit between a valve stem and a valve stem chamber, but varies depending on the arrangement and type of the control valve.

The bellows 501 may fail in an unpredictable and catastrophic manner from fatigue (e.g., metal fatigue) and/or corrosion. Because of the potential for failure, a packing member 515 may also be implemented in the control valve as a backup sealing structure. Bellows sealed valves usually implement an additional packing member 515 or sealing at a second portion of the valve stem 517 near the top of the valve stem. The second portion of the valve stem may be movable about a valve body opening. The packing 515 may act as a final defense against leaking through the valve stem 509 to atmosphere in case of rupture of the bellows 501.

While the packing 515 provides an additional safety barrier between the fluid of the process and the external atmosphere, the packing 515 may make it difficult to detect when a bellows seal fails until an actual external leak has already developed. Pressure sensors are generally used to indicate level and flow signals. For example, a digital positioner may be coupled to a pressure sensor for detecting applied actuator pressure. These pressure sensors may be used to provide control feedback. Pressure transmitters may be further used in control valves to detect low pressure in the actuator couplings or valve couplings. However, this low pressure reading alone may not provide information to distinguish bellows leakage from affects of valve stroking or from affects of temperature on the gas trapped between the bellows and the packing, which affects control valve movement.

FIG. 5A illustrates a control valve 507 adapted to detect a bellow seals deterioration or failure. In particular, FIG. 5A illustrates a pressure sensor 520 that may sense the pressure of fluid between the packing 515 and the bellows 501, where the space between the bellows 501 and the packing 515 may form a chamber 530. A second sensor 532 may sense valve travel. In this embodiment, the two sensors (i.e., the bellows chamber pressure sensor 520 and the travel sensor 532) may provide sensor readings or sensor data to a positioner 534. The positioner 534 may then apply an algorithm (further discussed below) to determine a potential bellows failure. It should be noted, that some digital positioners may be adapted to sense valve travel (i.e., the distance traveled by a positioner or the position of the valve at different times), and thus, in some embodiments, sensor 532 may be integrated into positioner 534.

A bellows failure may be indicated when the following conditions are determined:

1) Constant pressure inside chamber 530, while the valve stem is stroked or moved; or 2) Increase in pressure of chamber 530 without movement of the valve stem.

The two detection conditions listed above may be explained using the ideal gas law:

$$PV=nRT$$

In this application, P may be the pressure in chamber A, V may be the volume in chamber A, n may be the moles of gas in chamber A, R may be the ideal gas constant, and T may be the absolute temperature. Generally, as long as the bellows 501 functions and bellows gasket 511 adequately seals chamber 530 from process fluid (e.g., fluid in section 503 of the control valve), the volume in chamber 530 should be affected only by valve travel. Thus, if the bellows 509 and the bellows gasket 511 are not compromised, pressure and travel should be inversely proportional. In particular, pressure and travel should be inversely proportional by the product, nRT. However, when the bellows 509 leaks or ruptures, the relationship between pressure and volume of chamber 530 may be distorted. Thus, the conditions listed above may be indicative of the relationship between pressure and volume of chamber 530 upon leakage or rupture.

Figure 5B:
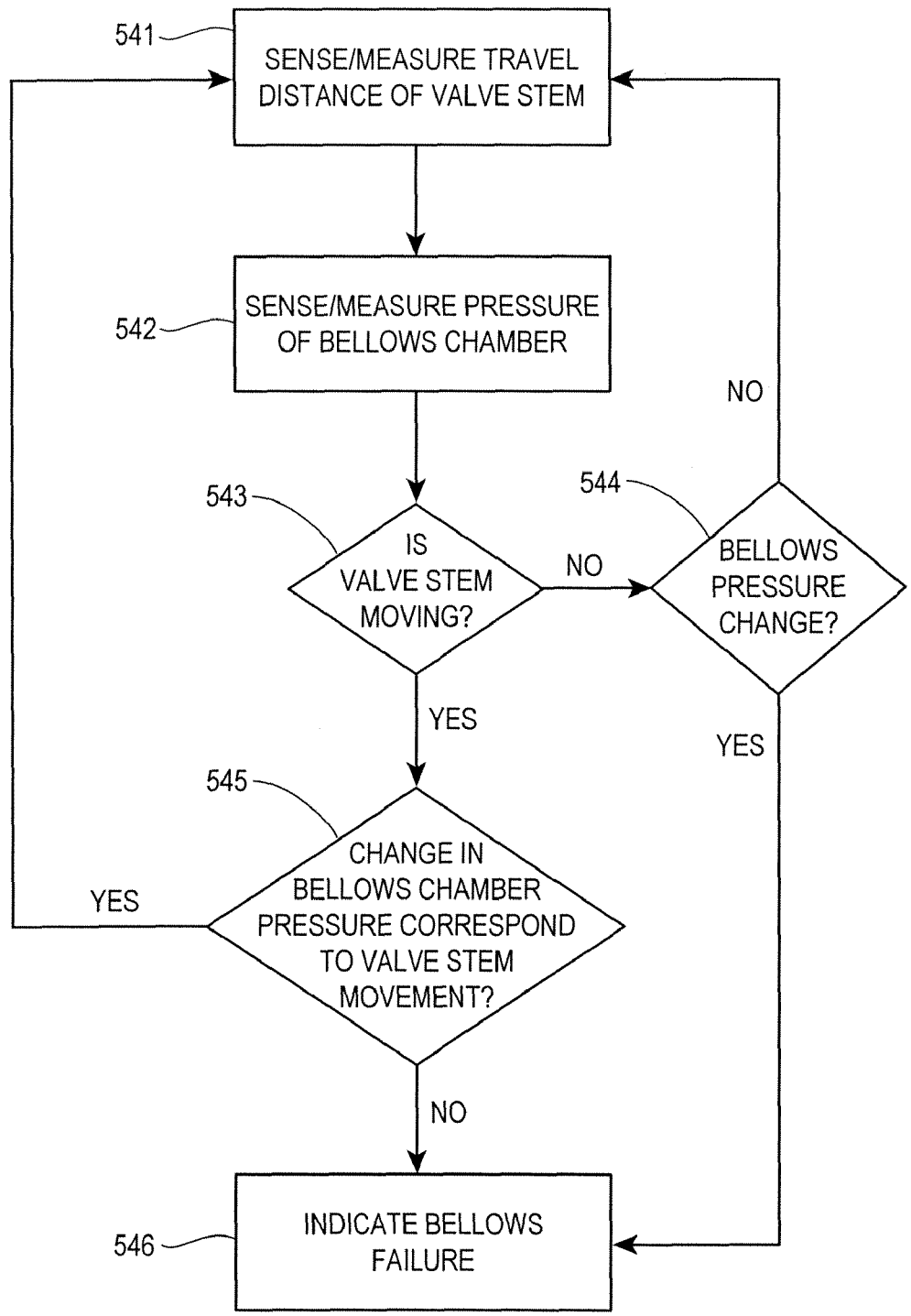
FIG. 5B illustrates a process embodiment for detecting a bellows failure.

FIG. 5B illustrates a process or algorithm embodiment for detecting a bellows or bellows gasket or seal failure in a control valve. In block 541, travel or movement of a valve stem may be sensed or measured. In one embodiment, the position of the valve stem may be sampled on a periodic basis and travel may be determined based on the difference between two sampled positions. In block 542, a change in pressure of the bellows chamber may be sensed. In one embodiment, a change in bellows chamber pressure may be sensed by periodically sampling the chamber pressure and taking the difference between two sampled readings. In one embodiment, the period for sampling the valve stem position and the bellows chamber pressure may be synched. In other words, both a position and applied pressure sample may be taken at the same time over a common period.

At block 543, it may be determined whether or not the valve stem is moving. If there is no valve stem movement, then it may be determined if there is a bellows chamber pressure change 544. In one embodiment, the change in pressure may be determined during the same period for which the valve stem was sensed to be still. If there is no valve stem movement 543 (i.e., the valve stem was still) and no pressure change 544, then the process may repeat from block 541. If the valve stem is still 543, and there is a pressure change, then a bellows failure indication may be generated 546.

If the valve stem is moving 543, then it may be determined whether there is a corresponding pressure change in the bellows chamber 545. If there is a corresponding bellows chamber pressure change at 545, then the process may repeat at block 541. If there is no corresponding bellows chamber pressure change 545, then a bellows failure indication may be generated 546. As discussed above, determining whether there is a corresponding pressure change at conditional block 545 may involve determining if the travel distance of the valve is inversely proportional to the change in bellows chamber pressure. Block 545 may further comprise determining if the travel distance of the valve is inversely proportional to the change in bellows chamber pressure by the product nRT.

In one embodiment, an optional process may be implemented as follows. If the valve stem is not moving for a number of cycles at block 543 (e.g., for a number of consecutive times in which block 543 detects no stem movement), then block 544 may monitor for bellows chamber pressure change over a longer period of time. In this embodiment, monitoring for a slow pressure decay in chamber 530 may be used to detect deterioration of the backup stem packing or a leak in the bellows gasket. When slow pressure decay is detected, a packing or gasket failure indicator may be generated. In one embodiment the valve stem may be still as a consequence of the control valve process (e.g., a long open or close period). In one embodiment, the valve stem may be intentionally stopped for a period of time to determine if there is a drop in pressure of chamber 530. In a further embodiment, the monitoring of slow pressure decay may be implemented as a separate process that is executed contemporaneously with the process of FIG. 5B.

It should be noted that while FIG. 5B illustrates a particular order of the blocks, the blocks may be sequentially rearranged and remain within the scope of this disclosure. For example, instead of checking valve stem movement first, pressure change in the bellows chamber may be checked first.

FIG. 5A illustrates that positioner 534 may receive inputs from position sensor 532 and pressure sensor 520. Positioner 534 may include computing capabilities. For example, positioner may include a computing device (e.g., a digital positioner) having a processor and memory and may be adapted to execute program instructions (e.g., store in the memory) to implement the process of FIG. 5B. It should be noted that while FIG. 5A illustrates that the detection process or algorithm may be implemented in a positioner, a computing device separate and distinct from a valve positioner may be used in other embodiments to collect or receive the sensor data from the two sensors 520 and 532, and apply the algorithm described herein to determine bellows failure.

Existing systems that may simply measure pressure changes in the interior cavity 503 of the control valve body may not provide the information to detect a bellows or packing failure. In other words, current systems may be prone to false alarms. In particular, it is difficult to distinguish whether the change in pressure (e.g., a pressure drop) is due to valve stem stroking or due to affects of temperature changes on the gas trapped in the bellows chamber (e.g., between the bellows and the packing). Gas permeation through the bellows, which is not a leakage condition, may cause an increase in temperature over time and may give a false alarm. Similarly, an increase in ambient temperature of the control valve environment may give a false alarm.

In one embodiment, upon detection of a bellows leak or failure, inert gas may be injected into the chamber A to insure safe operation of the control valve until maintenance may be performed.

Detecting Deterioration of Pneumatic Tubing and Actuator Diaphragm

Actuator leaks contribute to control valve performance degradation, and two potential leak areas may be leaks in instrument air tubing for the pneumatic actuator and compromised actuator diaphragms. Pressure sensors may be used to detect an applied pressure to a pneumatic actuator and data from the pressure sensors may show abnormal pressure function (e.g., excess gas flow through the actuator), thereby indicating a leak in the actuator. However, the cause or location of this actuator leak may not be easily identified. Thus, monitoring applied actuator pressure alone may not provide information to identify a leaky actuator component. In one embodiment, an algorithm may be used to determine and identify the cause of control valve performance degradation due to actuator component leaks.

Figure 6A:
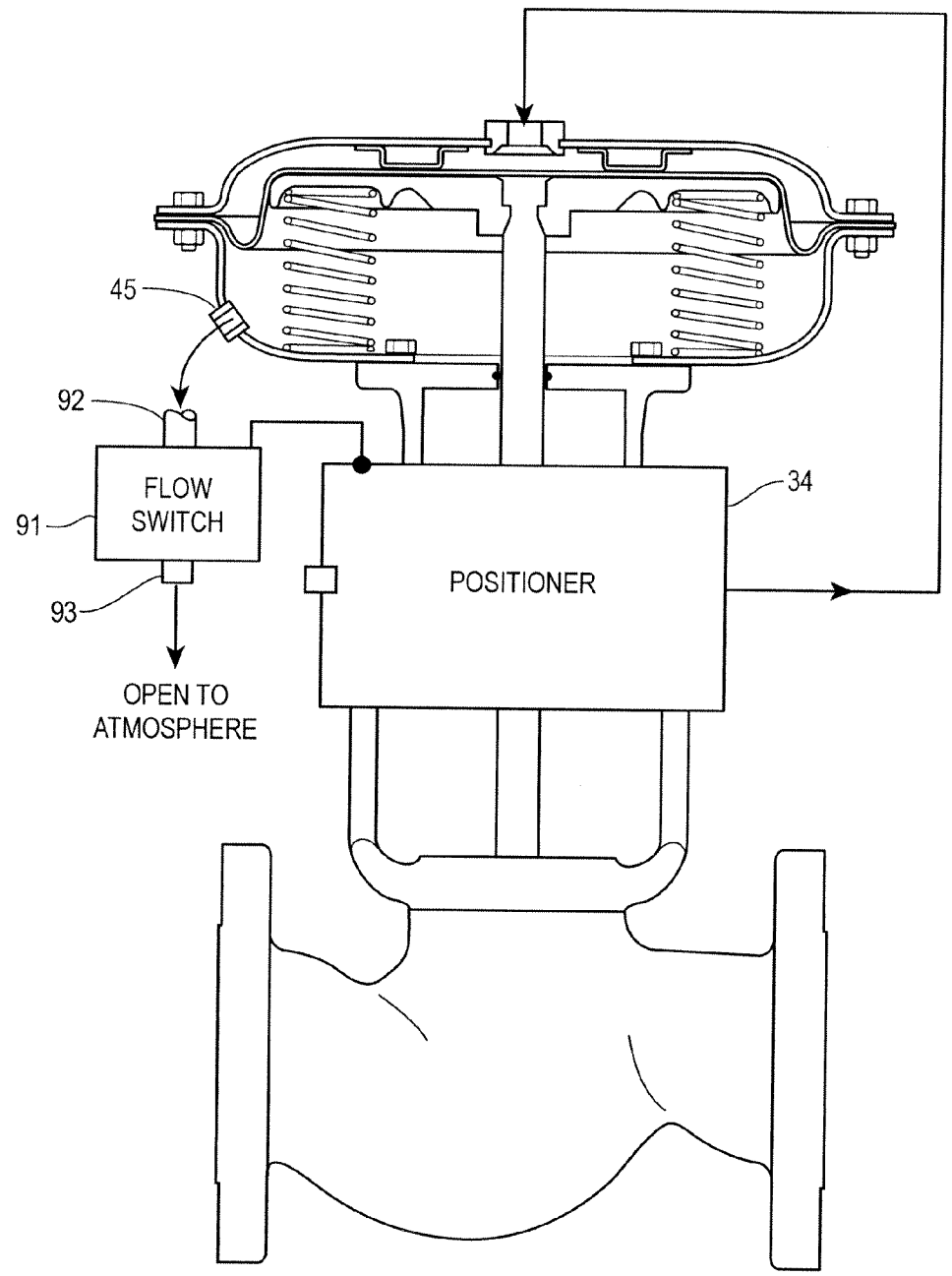
FIG. 6A illustrates an embodiment of a control valve adapted to identify leaks in a pneumatic actuator.

FIG. 6A illustrates an embodiment of a control valve adapted to identify leaks in a set of pneumatic actuator components. A positioner 34 may be a digital positioner that includes a computing device for operating the positioner and for executing a detection algorithm (as further described below). In the embodiment of FIG. 6A, a flow switch 91 may be installed on the actuator vent 45 and wired to the positioner 34. In this embodiment, the actuator vent 45 may be coupled to an inlet port 92 of the flow switch 91 while an outlet port 93 of the flow switch 91 is open to ambient atmosphere. Generally, a flow switch senses differential pressure between an inlet and outlet of the flow switch and actuates an electrical switch at a predetermined flow level. The flow switch 91 may be a commercially available flow switch. The flow switch 91 may be a passive device that does not require an external power source to operate.

In one embodiment, the flow switch 91 may be attached to the actuator vent 45 to indicate when the actuator vent is exhausting gas. In existing digital positioners, the positioner may include diagnostics for monitoring the pressure in the actuator chamber. For example, similar to the actuator spring embodiment described above, a pressure sensor may sense the applied pressure to the actuator and provide readings to the digital positioner. As discussed, the digital positioner may detect that some kind of leak exists when, for example, actuator pressure drops below a threshold. However, sensing a general actuator pressure drop alone (e.g., in a chamber of the diaphragm casing) may not provide information to identify a cause of the leak.

Figure 6B:
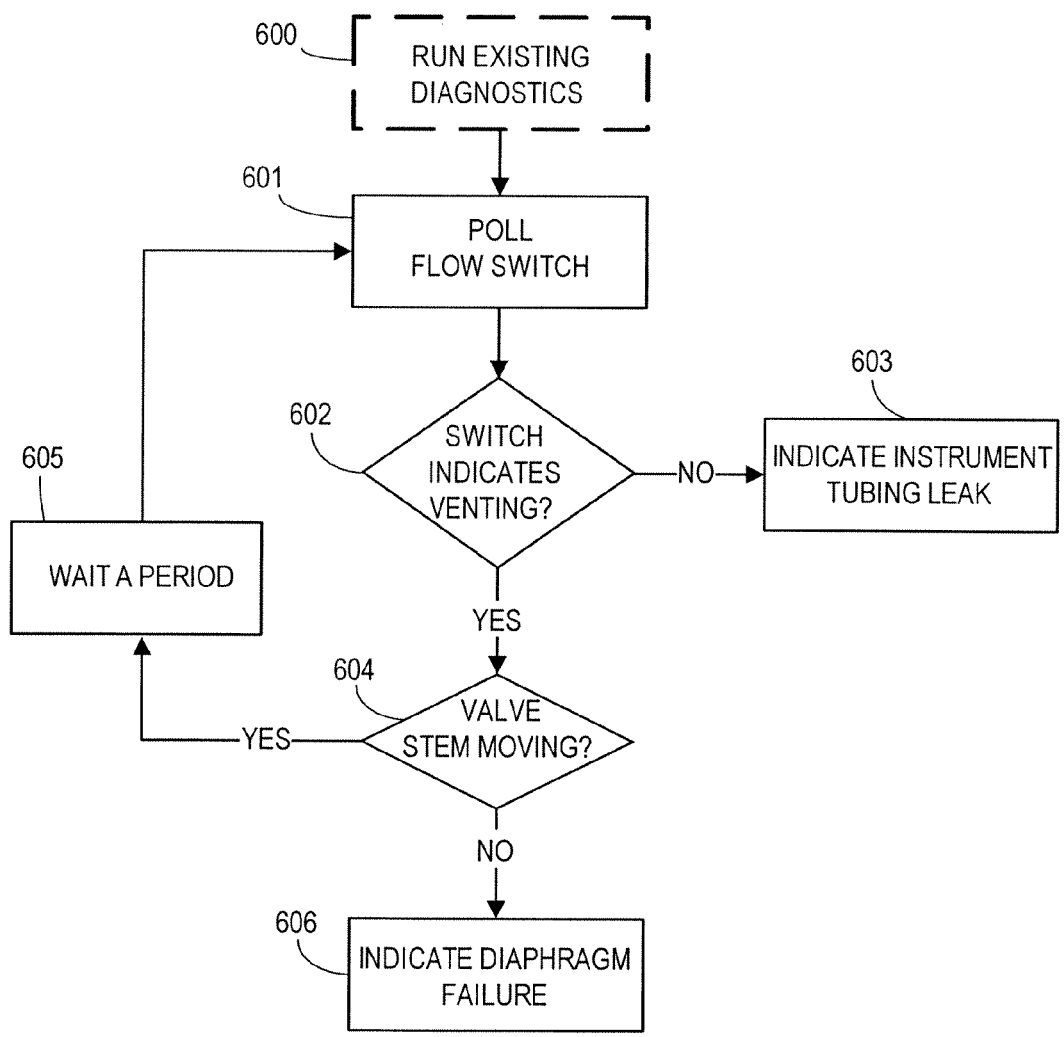
FIG. 6B illustrates a process embodiment for identifying an actuator leak component.

In an embodiment using the apparatus of FIG. 6A, an algorithm may be used to quickly identify the cause of the leak. FIG. 6B illustrates a leak detection algorithm or process. In block 600, a drop in actuator pressure may generate an actuator leak indication. When this leak indication is generated, received, or noticed, the diaphragm flow switch may be polled 60, to determine a flow condition. If the flow switch indicates that gas is being exhausted through the actuator vent at block 602, an instrument tubing leak may exist. When this condition exists, the digital positioner or detection device may generate an indication of a tubing leak 603. If the flow switch indicates that gas is not being exhausted through the actuator vent at block 602, then block 604 may determine whether the valve stem is moving. Valve stem movement may be determined by existing valve stem travel or position sensors that sense the position/movement of the valve and actuator stem. Valve stem movement generally causes exhaust venting. Thus, if the valve stem is moving, then the cause of the leak may be indeterminate. In this case, the process may wait a period 605 before polling the flow switch 601 again and repeating the above process blocks. If it is determined that the valve stem is not moving at 604 when the flow switch indicates venting at block 602, then a diaphragm failure may exist. In this case, an indication of a defective diaphragm or an indication of a diaphragm failure may be generated 606.

As discussed above, the flow switch may be a commercially available passive flow switch. For example, the flow switch may be a Gentech FCS-04 or Malema M-60/M064 switch. Different implementations of the flow switch may have either a closed switch position or an open switch position correspond to an open or closed vent. The algorithm above may be configured appropriately to match the switch polarity.

Figure 7:
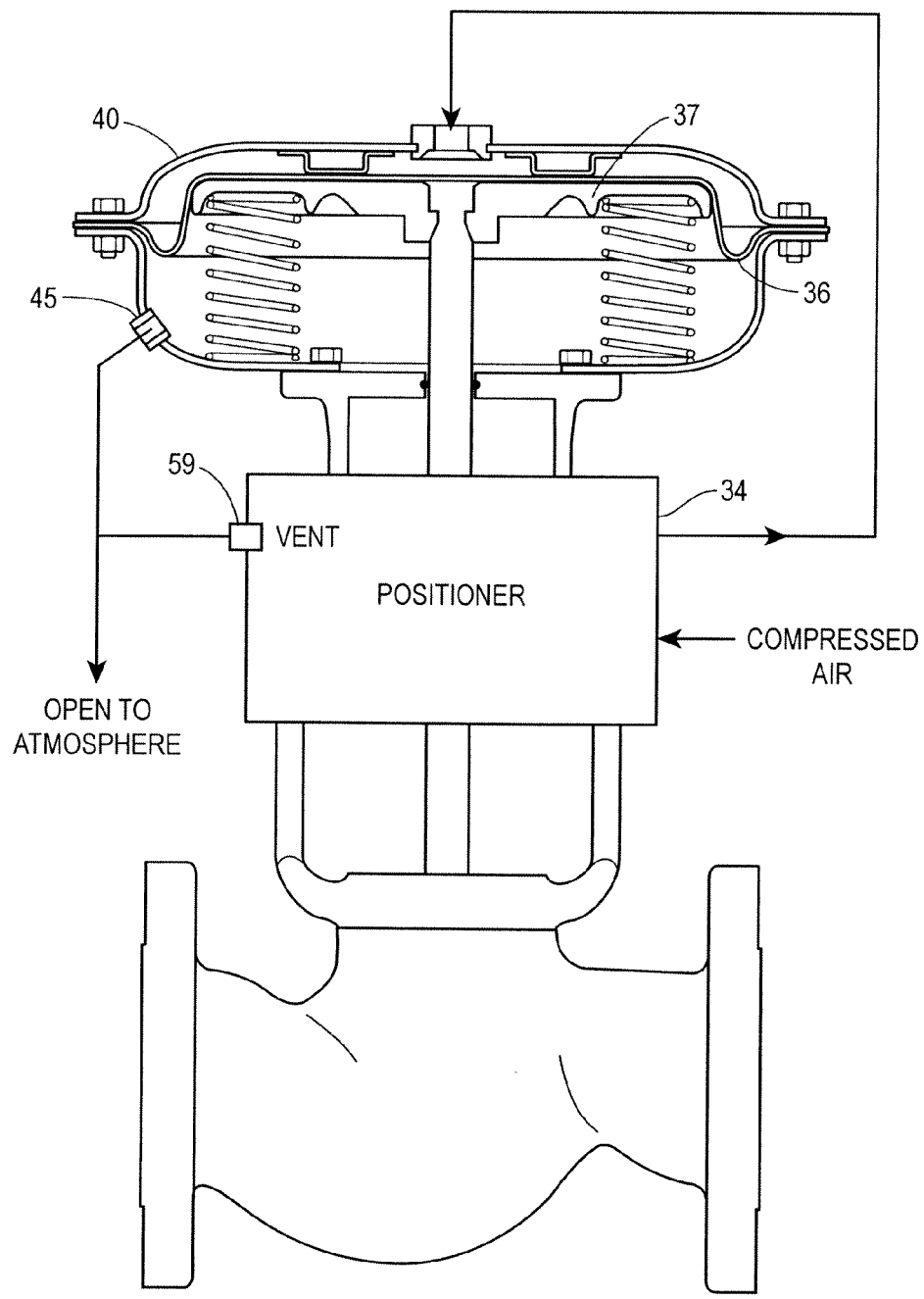
FIG. 7 illustrates a configuration of a pneumatic actuator in which a vent of a positioner is fluidly coupled to a vent of the actuator.

Generally, current spring and diaphragm actuator designs may subject springs and diaphragms on the vented side of the actuator to atmospheric corrosion. This exposure shortens the diaphragm life and atmospheric corrosion from salt in marine installations or from fugitive emissions may shorten the effective life of the springs. A solution to this problem may be to couple the positioner vent to the vent actuator as illustrated in FIG. 7. FIG. 7 illustrates that a vent 59 of the positioner 34 is fluidly coupled to a vent 45 of the diaphragm casing 40. In this configuration, when the positioner 34 is applying a pressure to the diaphragm 36, gas may be forced out of the actuator vent 45 by the downward movement of the diaphragm 36 and diaphragm plate 37. When the positioner 34 is venting a chamber of the actuator diaphragm casing 40, the diaphragm 36 moves upward (in this configuration) and vented, compressed air is exhausted from the positioner vent 59 into the tubing connected to the actuator vent 45. In this manner, air entering the actuator 49 is primarily compressed air from the positioner vent 59, instead of external atmospheric air. The result is that the diaphragm and springs primarily contact compressed air from a compressed air source, which is usually filtered and dry, instead of potentially corrosive atmosphere (e.g., humid and salt laden).

Figure 8:
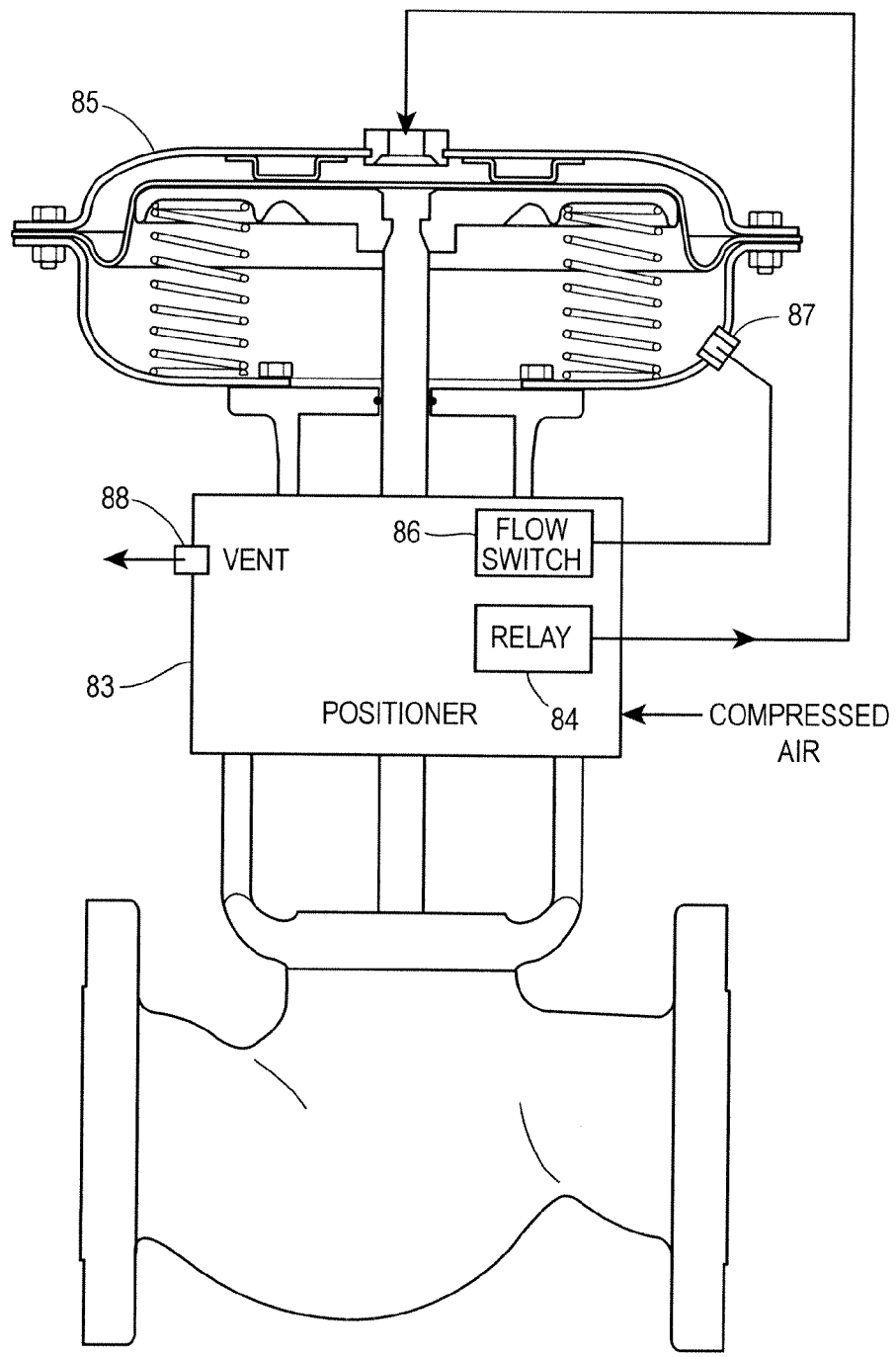
FIG. 8 illustrates an embodiment of the leak detection system using a modified double acting positioner.

FIG. 8 illustrates an embodiment of the leak detection system using a modified double acting positioner 83 that builds on the principles illustrated in FIG. 7. In a typical double actuating positioner, two supply outlets may be provided for supplying compressed air to the actuator, where each supply outlet may be controlled by a designated pneumatic relay, such as relay 84. When the double actuating positioner is installed in a diaphragm actuator that only requires a single compressed air supply, e.g., actuator 85, then the second relay may be replaced with a flow meter 86. In this case, an actuator vent 87 may be connected back to the modified positioner 83 to the flow switch 86. The actuator vent 87 may then be coupled to the positioner vent 88 via the flow switch 86 (internal connecting passageway not shown), to produce a similar effect to that of FIG. 7. In this manner, a control valve may be easily adapted to implement the diagnostics process described above with the corrosion protection from a coupled vent configuration. Thus, modification of a double acting positioner for installation into a diaphragm and spring actuator may provide an economical incorporation of the diagnostic design described herein and also provide a more appealing package. Moreover, the flow switch 86, now disposed within the positioner 83 itself, may be more easily integrated or connected to the positioner circuitry.

The benefit of detection and identification of defective tubing or defective actuator diaphragm is the difference in cost to remedy one defect from the other. Generally, a tubing leak may be remedied simply in the field in a short period using readily available materials and may not require the valve to be removed from service or taken offline. For example, in some situations the remedy may simply involve tightening fittings. A diaphragm failure, on the other hand, may require spare parts that may not be available and may take a significantly longer period to fix. Moreover, a diaphragm failure may require the control valve to be taken offline while the actuator is taken apart.

Computing Device Implementations

The above processes or algorithms may be implemented in computing devices for detecting deterioration of a valve component and/or identifying a component fault during operation of the control valve. The deterioration detection algorithm may be implemented in a detection module. It should be noted that the term detection module is used herein to refer to any type of block or element that collects data, such as sensor data, and performs some processing on this data to determine an event, such as a defect or failure event as described above. As a result, this term is intended to cover software, firmware, hardware and/or other elements that perform this function, whether these elements are in the form of function blocks, or other types of blocks, programs, routines or elements.

Figure 9:
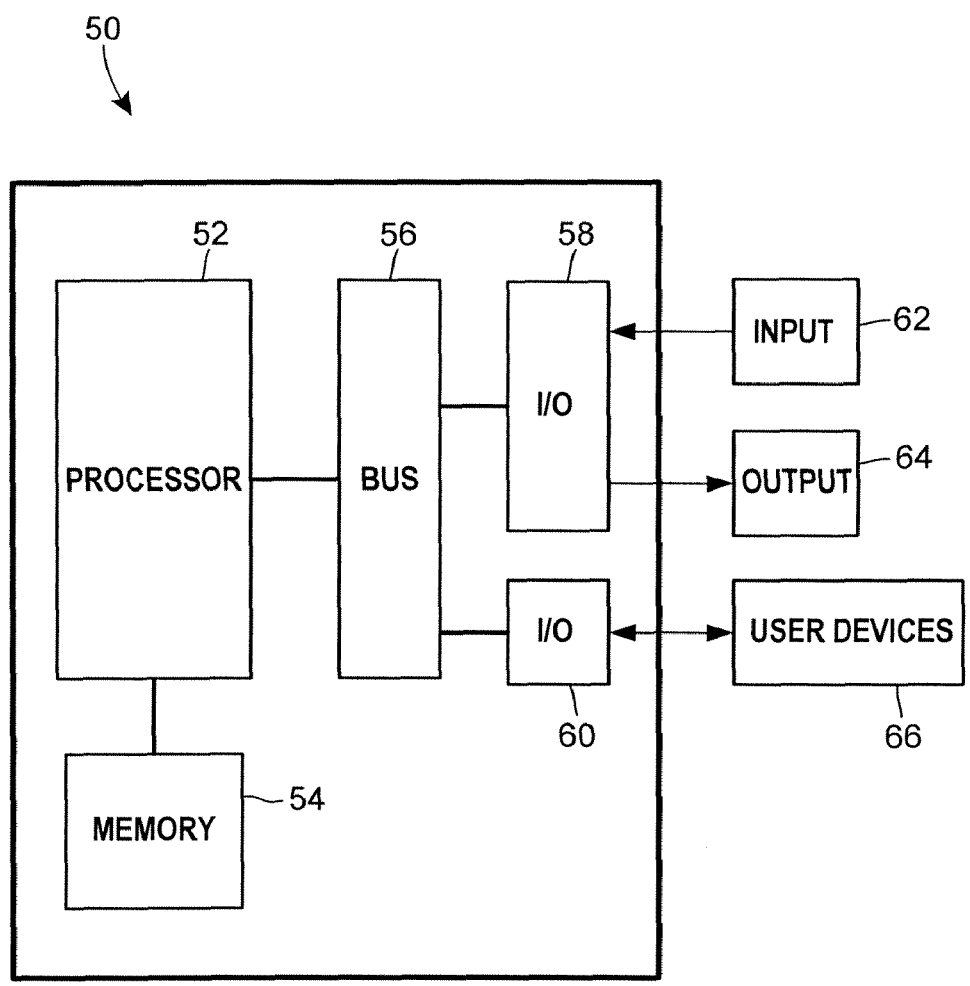
FIG. 9 illustrates a computing device that may be used to implement a detection algorithm.

FIG. 9 illustrates a computing device that may be used to implement a detection algorithm. Components of computing device 50 may include, but are not limited to, a processing unit 52, a system memory 54, and a system bus 56 that couples various system components to the processing unit 52. Memory 54 may be any available media that is accessible by the processing unit 52 and includes both volatile and nonvolatile media, removable and non-removable media. A user may enter commands and information into the computing device 50 through user input devices 66, such as a keyboard and a pointing device. These and other input devices may be connected to the processing unit 52 through a user input interface 60 that may be coupled to the system bus 56. A monitor or other type of display device may also be connected to the processor 52 via the user interface 60. Other interface and bus structures may also be used. In particular, inputs 62 from other devices (e.g., sensors), may be received at the computing device 50 via input/output (I/O) interface 58 and outputs 64 from computing device 120 may be provided by the input/output (I/O) interface 58 to other devices. The interfaces 58 and 60 connect various devices to the processor 52 via the system bus 56.

Figure 10:
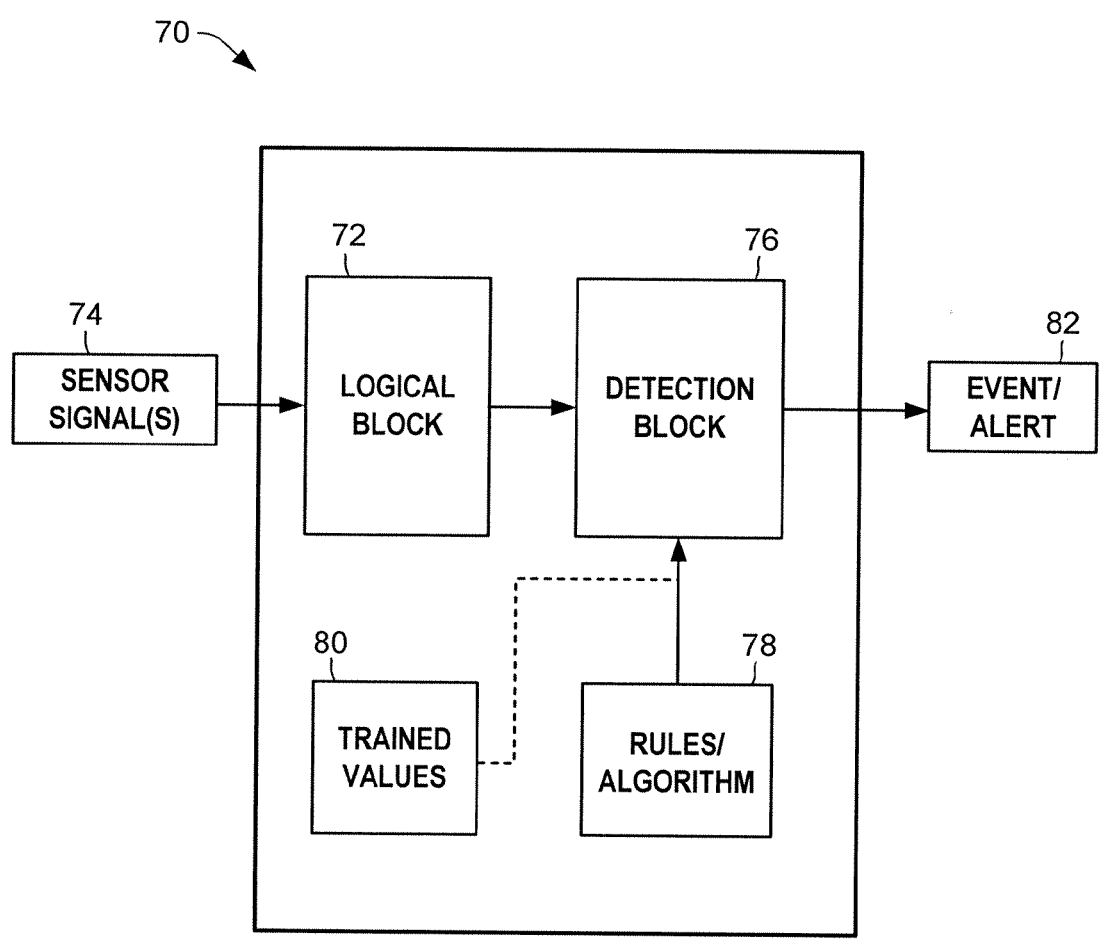
FIG. 10 illustrates an embodiment of a detection module.

FIG. 10 illustrates a detection module 70 that may be implemented on the computing device 50 of FIG. 9. In one embodiment, the detection module 70 illustrated in FIG. 10 may be used to implement an algorithm for detecting actuator spring deterioration in a pneumatic control valve by receiving an input such as the change in pressure applied to an actuator and a valve travel distance.

A logical block 72 may receive a set of (i.e., one or more) sensor/measurement signals 74 and may calculate parameters for the set of process signals 74 (e.g., differentials, averages, etc.). The calculated parameter(s) may be received by a detection block 76 which operates in accordance with rules contained in a rules block 78. The rules block 78 may be implemented, for example, in a portion of the memory 54 of computing device 50 (FIG. 9) and may define an algorithm for detecting a deteriorating or faulty component, as further discussed below.

In one embodiment, a first set of calculated parameters may be stored in trained value block 80. The trained values may be calculated and periodically updated, for example, by the computing device 50. For example, in one embodiment, the trained values may be generated by the logical block 72 which generates, or learns, the nominal or normal parameters during a first period of operation, typically a period during normal operation of the process or during a configuration phase. These nominal parameters may then be stored as trained values in the trained values block 80 for future use. This operation allows dynamic adjustment of trained values 80 for a specific operating condition. In this situation, parameters (which may be used for the trained values) may be monitored for a user selectable period of time based upon the process or operating situation. In one embodiment, a computing device such as the computing device 50 may generate or receive the trained values or be used to transmit the trained values to another process device.

The rules block 78 may contain rules for detecting or identifying a component fault as described above. For example, rules block 78 may contain program instructions that implement one or more of the processes described above for determining a component fault. The detection block 76 may be programmed to output an alert 82 when a fault event is detected.

In one embodiment, a statistical process monitoring approach may be implemented to further refine the one ore more of the deterioration detection algorithms described above. For example, when applied to the spring fault detection algorithm, the logical block 72 may determine a baseline mean ($\mu$) and a baseline standard deviation ($\sigma$) of the change in actuator pressure ($\Delta P$) for a given actuator rod travel distance ($\Delta T$) during an initial configuration or learning period. These parameters may be considered a representation of the process in a "normal" condition. The baseline mean and baseline standard deviation may then be stored in the memory 54 as training values (i.e., using block 80). During a monitoring phase, the module 70, implementing the algorithm, may take current values of the pressure change and calculate the process mean ($\bar{x}$) and standard deviation ($s$) of the pressure change for a given change in valve travel (or vice versa).

Using an SPM algorithm implemented, for example, via calculation block 76, spring deterioration may be detected at the detection block 76 if the actual or current mean differs from the baseline mean by more than some threshold and an indication or an alarm 82 may be outputted. For example, spring failure may be detected if the current mean is more than a certain percent below the baseline mean:

$$\bar{x} < \left(1 - \frac{\alpha}{100}\right) \cdot \mu$$

where α is some user-defined percent (e.g., 5%). This equation may be represented as one or more rules in the rules block 78. In one embodiment, the detection module 70 may include an input for a detection threshold (e.g., one determined by a user). In this embodiment, the detection threshold may be stored as a trained value.

In another embodiment, the threshold may be set based on a variance observed during the learning phase. For example, spring fault may be detected if $\bar{x} < \mu - 3\sigma$. In this case, the observed variance may be stored in the memory 54 via the trained value block 80. Thus, in this embodiment, the detection threshold is determined automatically, and the amount of manual configuration may be reduced. It should be noted that any other multiplier for the standard deviation besides three may be used, depending on the observed or detected variance. Also, while the variance variable may be automatically calculated by the detection module, this variable may be a user-configurable parameter input as a trained variable (e.g., via user I/O 66).

In another embodiment, an initial spring constant value may be given (e.g., provided by a manufacturer for a particular pneumatic control valve) and this initial spring constant may be stored as a trained value without computing or verifying an initial spring constant. In one embodiment, predetermined thresholds for the algorithms may be stored in trained values block 80.

In a similar manner, SPM may be applied to the bellows leak detection algorithm, where the logical block 72 may determine a baseline mean (μ) and a baseline standard deviation (σ) of the change in bellows chamber pressure for a given valve stem movement (or vice versa) during an initial period. During a monitoring phase, the detection module 70, implementing the algorithm, may take current values of the pressure change and valve stem travel and calculate the process mean ($\bar{x}$) and standard deviation (s) of one variable against a change in the other. When the difference in actual and expected deviation exceeds a threshold, an indication of a bellows leaks may be generated.

Figure 11:
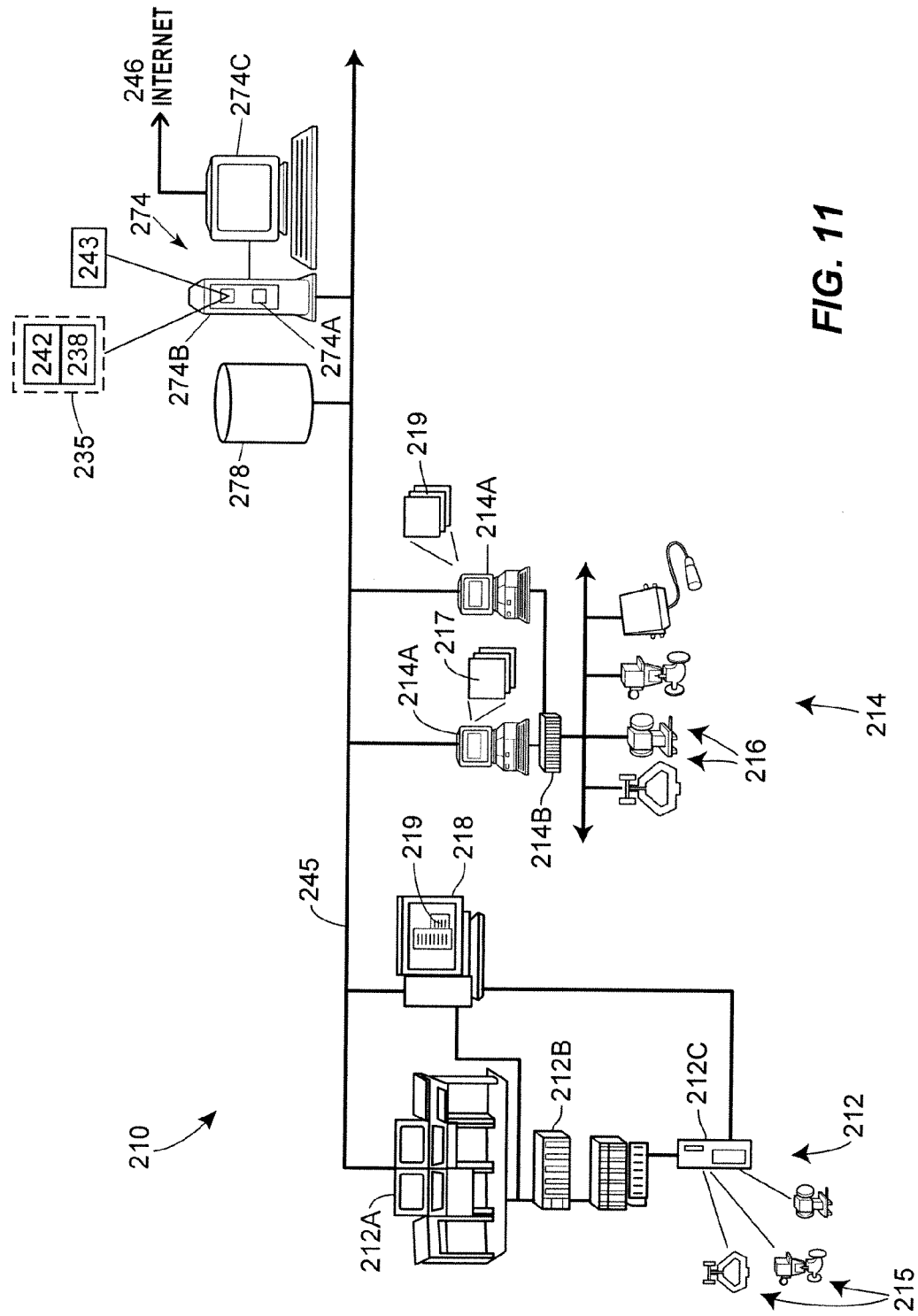
FIG. 11 illustrates a process control system of a process plant that may implement one or more control valves and detection modules.

A Process Control System For Use With The Actuator Spring Deterioration Detection Module Generally, a control valve such as that described above, may be implemented in and controlled by a process control system such as that illustrated in FIG. 11. A detection module containing the algorithm may be implemented in one or more components of the process control system of FIG. 11.

Referring specifically to FIG. 11, an example process plant 210 may include a number of control and maintenance systems interconnected together with supporting equipment via one or more communication networks. In particular, the process plant 210 of FIG. 11 may include one or more process control systems 212 and 214. The process control system 212 may be a traditional process control system such as a PROVOX or an RS3 system or any other control system which includes an operator interface 212A coupled to a controller 212B and to input/output (I/O) cards 212C which, in turn, are coupled to various field devices such as analog and Highway Addressable Remote Transmitter (HART®) field devices 215. The process control system 214, which may be a distributed process control system, includes one or more operator interfaces 214A coupled to one or more distributed controllers 214B via a bus, such as an Ethernet bus. The controllers 214B may be, for example, DeltaV™ controllers sold by Emerson Process Management of Austin, Tex. or any other desired type of controllers. The controllers 214B are connected via I/O devices to one or more field devices 216, such as for example, HART or FOUNDATION™ Fieldbus field devices or any other smart or non-smart field devices including, for example, those that use any of the PROFIBUS®, WORLDFIP®, Device-Net®, AS-Interface and CAN protocols.

Generally, a process controller, such as process controller 212B or 214B, may communicate with a plant network system to provide information about operations under the process controller's management (e.g., field device operation) and to receive setpoint signals from the plant network system that are used in adjusting the operation of a process controller. As is known, the field devices 215 or 216 may control a physical process parameter (e.g., as an actuator in a control valve or other mechanism) or may measure a physical process parameter (e.g., as a sensor). The field devices may communicate with the controllers 212B or 214B to receive a process control signal or to provide data on a physical process parameter. The communication may be made via analog or digital signals. I/O devices, such as I/O device 212C, may receive messages from a field device for communication to a process controller or may receive messages from a process controller for a field device. The operator interfaces 214A (or 212A or 218) may store and execute tools 217, 219 available to the process control operator for controlling the operation of the process including, for example, control optimizers, diagnostic experts, neural networks, tuners, etc.

Maintenance systems may be connected to the process control systems 212 and 214 or to the individual devices therein to perform diagnostic and monitoring activities. For example, a maintenance computer 218 may be connected to the controller 212B and/or to the devices 215 via any desired communication lines or networks (including wireless or handheld device networks) to communicate with and, in some instances, reconfigure or perform other maintenance activities on the devices 215. Similarly, maintenance applications may be installed in and executed by one or more of the user interfaces 214A associated with the distributed process control system 214 to perform maintenance and monitoring functions, including data collection related to the operating status of the devices 216.

A computer system or workstation 274, which may represent any of workstations 212A, 214A, or 218, may generally include a processor 274A, a memory 274B and a display device 274C. Workstation 274 may implement at least a portion of an abnormal situation prevention system 235 (sometimes called an abnormal situation prevention system) and in particular, the computer system 274 may store (e.g., using memory 274B) and implement a configuration application 238 and a fault detection system 242 (e.g., using processor 274A) to provide information to a user via the display 274C (or any other display device, such as a printer). Additionally, the computer system 274 may implement an alert/alarm application 243. Of course, detection system 235, alert application 243, and/or configuration system 238 may be executed as part of the same or different software component.

A database 278 may be connected to the communication bus 245 to operate as a data historian that collects and stores configuration information as well as on-line process variable data, parameter data, status data, and other data associated with the process controllers 212B or 214B and the field devices 215 or 216 within the process plant 210.

Generally speaking, the abnormal situation prevention system 235 may communicate with detection modules optionally located in the field devices 215, 216, the controllers 212B, 214B, and any other desired devices and equipment within the process plant 210, and/or the fault detection system 242 in the computer system 274, to configure each of these components to receive information regarding the operation of the devices or subsystems that they are monitoring. The abnormal situation prevention system 235 may be communicatively connected via a hardwired bus 245 to each of at least some of the computers or devices within the plant 210 or, alternatively, may be connected via any other desired communication connection including, for example, wireless connections, dedicated connections which use OPC, intermittent connections, such as ones which rely on handheld devices to collect data, etc. Likewise, the abnormal situation prevention system 235 may obtain data pertaining to the field devices and equipment within the process plant 210 via a LAN or a public connection, such as the Internet, a telephone connection, etc. (illustrated in FIG. 11 as an Internet connection 246) with such data being collected by, for example, a third party service provider. Further, the abnormal situation prevention system 235 may be communicatively coupled to computers/devices in the plant 210 via a variety of techniques and/or protocols including, for example, Ethernet, Modbus, HTML, XML, proprietary techniques/protocols, etc.

Additionally, each of the field devices 215 and 216 may be any type of device such as, for example, a sensor, a valve, a transmitter, a positioner, etc., and may conform to any desired open, proprietary or other communication or programming protocol. Also it is to be understood that the I/O devices 212C may be compatible with the desired protocol used by the field devices 215.

Each of one or more of the field devices 215 and 216 may include a memory (not shown) for storing routines such as routines for implementing detection algorithms for abnormal component detection, which will be described below. Each of one or more of the field devices 214 and 216 may also include a processor (not shown) that executes routines such as routines for implementing sensor data collection and/or routines for component fault detection. It should be noted that sensor data collection and/or abnormal operation detection need not be implemented by software. Rather, one of ordinary skill in the art will recognize that such systems may be implemented by any combination of software, firmware, and/or hardware within one or more field devices and/or other devices.

The detection module 70 of FIG. 10 may be implemented wholly or partially in a field device and the field device may then be coupled to a pneumatic control valve similar to the ones described above. In one embodiment, the detection module may be implemented in a process controller 212B or 214B, a workstation 274 (e.g., via detection application 242), or some other device. Alternatively, the process blocks of detection module 70 may be wholly implement in a field device (e.g., 215 or 216) or divided among a field device and a process controller. In one particular implementation, the detection module 70 may be implemented as a function block, such as a function block described above and used in a process control system that implements a FOUNDATION™ Fieldbus protocol.

Because component failure may be detected using different combinations of sensors (as discussed above), any of the field devices described in FIG. 11 having a sensor may be used to take measurements of the relevant parameters (e.g., pressures, travel, flow, etc.). However, there may be advantages to using a field device with built-in signal processing (e.g., a Rosemount 3051S with abnormal situation prevention). In particular, because a process control field device has access to data sampled at a much faster rate than a host system (e.g., a workstation collecting measurements from field devices via a process controller), sensor data calculated in the field device may be more accurate. As a result, the detection modules implemented in a field device may generally be capable of determining finer grained calculations with respect to the collected sensor data than a block located outside of the device in which the sensor data is collected. Thus, in some situations, faster detection of a fault may be achieved using a field device with built-in signal processing.

It should be noted that a Rosemount 3051 FOUNDATION™ Fieldbus field device has an Advanced Diagnostics Block (ADB) with statistical process monitoring (SPM) capabilities. This SPM block may have the capability to learn a baseline mean and standard deviation of a process variable (e.g., a signature graph), compare the learned process variables against a current mean and standard deviation, and trigger a PlantWeb® alert if either of these changes by more than the user-specified threshold. It is possible that the SPM functionality in the field device may be configured to operate as an detection module based on the description herein to detect component failure.

The alert/alarm application 243 may be used to manage and/or route alerts created by a detection module 70 of the plant 210, where detection module 70 may implement one or more of the algorithms described above. In this case, when a deterioration or failure event is detected, a meaningful alert may be provided to a person or group responsible for monitoring and maintaining operations (e.g., an operator, an engineer, a maintenance personnel, etc.). Guided help may be provided to help a person to resolve the situation through a user interface (e.g., on workstation 274 connected to the process control system). Corrective actions that may be presented to a user in response to the alert may include directions to repair a component or to schedule maintenance for the control valve. For example, in the actuator leak detection described above, upon receiving an indication of the source of the actuator leak (e.g., diaphragm failure or instrument tubing), workstation 274 may direct or provide instructions to a user to either tighten fittings to remedy the tubing leak or schedule a replacement of an actuator diaphragm.

The detection module 70 may provide information to the abnormal situation prevention system 235 via alert application 243 and/or other systems in the process plant. For example, the fault indication generated by detection block 76 may be provided to the abnormal situation prevention system 235 and/or the alert/alarm application 243 to notify an operator of the defect condition. As yet another example, the detection module 70 may provide parameter values to the abnormal situation prevention system 235 so that an operator may view the values (e.g., when a component fault has been detected).

In a process control system, the detection module 70 (implemented via a field device or process controller) may be in communication with configuration application 238 to permit a user to configure the detection module 70. For instance, one or more of the blocks of detection module 70 may have user configurable parameters (e.g., initial actuator spring constant to be provided by a manufacturer or plant database) that may be modified via the configuration application 238.

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments may be implemented, using either current technology or technology developed after the filing date of this patent, which would still fall within the scope of the claims.

The invention claimed is:

1. A method of detecting a spring failure in a pneumatic control valve actuator comprising:
    determining an initial spring constant value ($K_{initial}$) of a set of springs of an actuator in a control valve during a first period of operation;
    receiving from a travel sensor an indication of a travel distance ($\Delta T$) of an actuator rod coupled to the actuator;
    receiving from a pressure sensor an indication of a change in applied pressure ($\Delta P$) to the actuator, wherein the change in applied pressure corresponds to the travel ($\Delta T$) of the valve;
    determining in a processor communicatively coupled to the valve actuator a current spring constant value ($K_{current}$) of the set of actuator springs during a second period of operation of the control valve based on the sensed travel distance ($\Delta T$) and corresponding sensed pressure difference ($\Delta P$); and
    generating in the processor an indication of a spring defect if the current spring constant value ($K_{current}$) is different from the initial spring constant value ($K_{initial}$) by more than a predetermined threshold.

2. The method of claim 1, wherein the predetermined threshold is calculated using the equation:

$$\frac{\sum_{S=1}^{n} K_S}{K_1},$$

wherein n=total number of springs and K=a spring constant.

3. The method of claim 1, wherein determining the current spring constant value comprises calculating the current spring constant ($K_{current}$) value using the equation: $\Delta PA = \Delta T K_{current}$, wherein A is an effective area of a diaphragm of the actuator.

4. The method of claim 1, wherein the sensing of a change in applied pressure ($\Delta P$) to the actuator comprises measuring an initial applied pressure at a first position of the valve and measuring a second applied pressure at a second position of the valve, and further wherein the travel distance is the distance between the first and second position.

5. The method of claim 1, wherein the set of springs includes a plurality of springs and the initial and the current spring constant value is an aggregate spring constant value of the plurality of springs.

6. The method of claim 1, wherein the sensing of a travel distance ($\Delta T$) and the sensing of a change in applied pressure ($\Delta P$) is performed during operation of the valve.

7. A device for detecting spring failure in a pneumatic control valve actuator comprising:
    a first input for receiving data on a pressure applied to a diaphragm of a pneumatic actuator in the control valve;
    a second input for receiving data on a travel distance of an actuator rod of a control valve;
    a processor and a memory operatively coupled to the processor, wherein the processor is programmed to:
    calculate a spring constant based on the pressure data and travel data,
    determine a spring failure event in the pneumatic control valve based on at least the calculated spring constant, and
    generate an indication when a spring failure event occurs.

8. The device of claim 7, wherein calculating a spring constant comprises calculating a spring constant using $\Delta PA = \Delta T K_a$, wherein $K_a$ is the spring constant,
$\Delta T$ is a travel distance between a first rod position and a second rod position,
$\Delta P$ is the pressure difference,
A is an effective diaphragm area for a diaphragm of the actuator.

9. The device of claim 7, wherein the memory stores an initial value of the spring constant and a threshold.

10. The device of claim 9, wherein the spring failure event is determined when a calculated spring constant value is different than the initial spring constant value by more than the threshold.

11. The device of claim 7, further comprising transmitting the indication across a process control network using a communication protocol, wherein the communication protocol comprises one of HART or Foundation Fieldbus.

12. A system for detecting spring failure in a pneumatic control valve actuator comprising:
    a process control system including a workstation, a process controller, and a plurality of field devices, wherein the workstation, process controller, and the plurality of field devices are communicatively connected to each other;
    a control valve including an actuator, an actuator diaphragm, and an actuator spring for biasing the actuator diaphragm, wherein at least one field device is adapted to measure the pressure applied to the diaphragm and at least one field device is adapted to measure a travel distance of an actuator rod coupled to the actuator diaphragm; and
    a detection device adapted to receive data on the measured actuator pressure and actuator rod travel distance, to calculate a spring constant value using the received data, to access a stored initial spring constant value, and to generate an alert when a difference between the calculated spring constant value and the initial spring constant value exceeds a threshold.

* * * * *

UNITED STATES PATENT AND TRADEMARK OFFICE
CERTIFICATE OF CORRECTION

PATENT NO. : 8,036,837 B2
APPLICATION NO. : 12/040498
DATED : October 11, 2011
INVENTOR(S) : Galen D. Wilke Page 1 of 1

It is certified that error appears in the above-identified patent and that said Letters Patent is hereby corrected as shown below:

In the Specification:

At Column 12, line 46, "ore" should be -- or --.

At Column 16, line 22, "an detection" should be -- a detection --.

Signed and Sealed this
Second Day of July, 2013

Teresa Stanek Rea
*Acting Director of the United States Patent and Trademark Office*